UNITED STATES PATENT OFFICE.

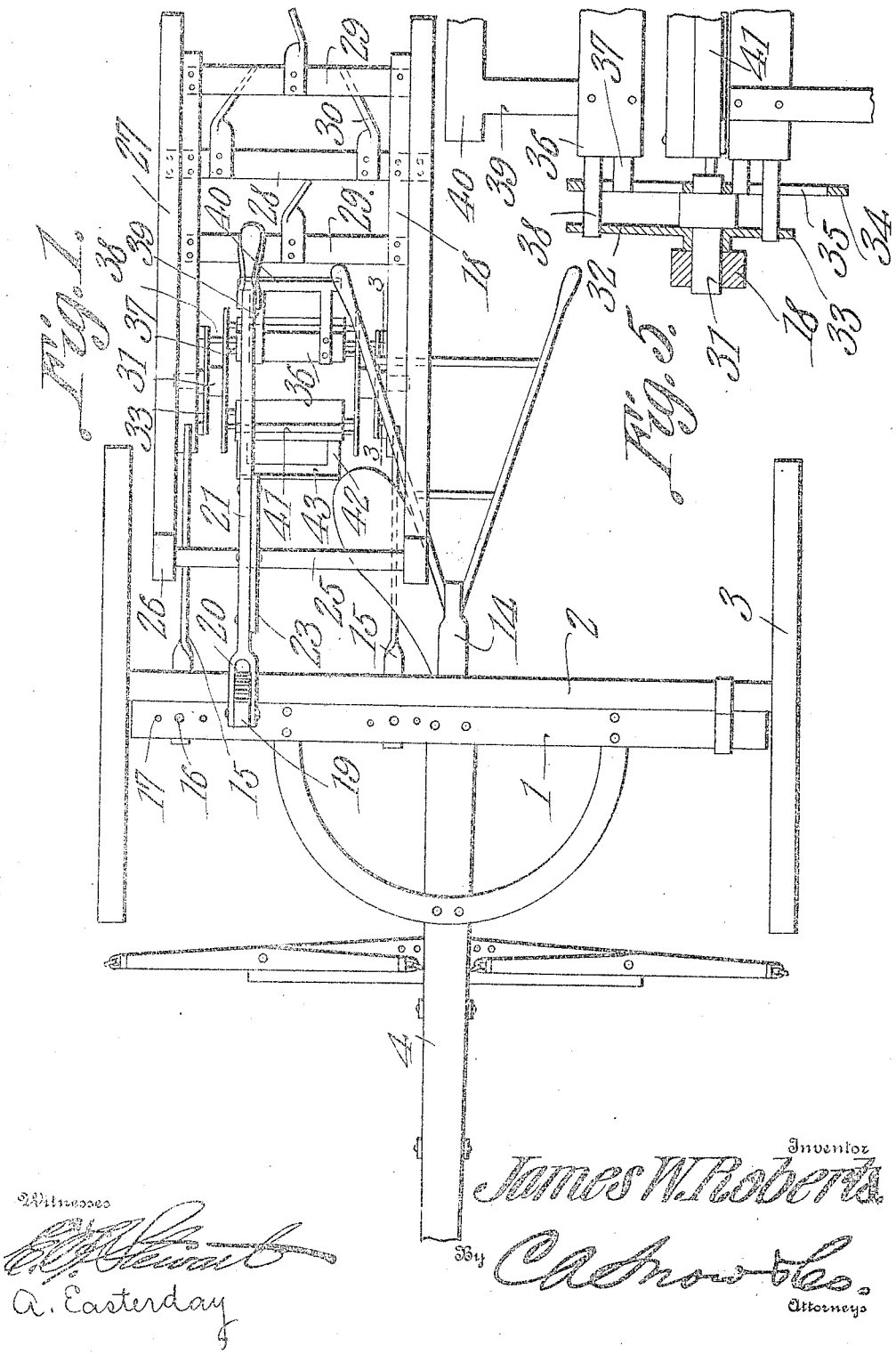

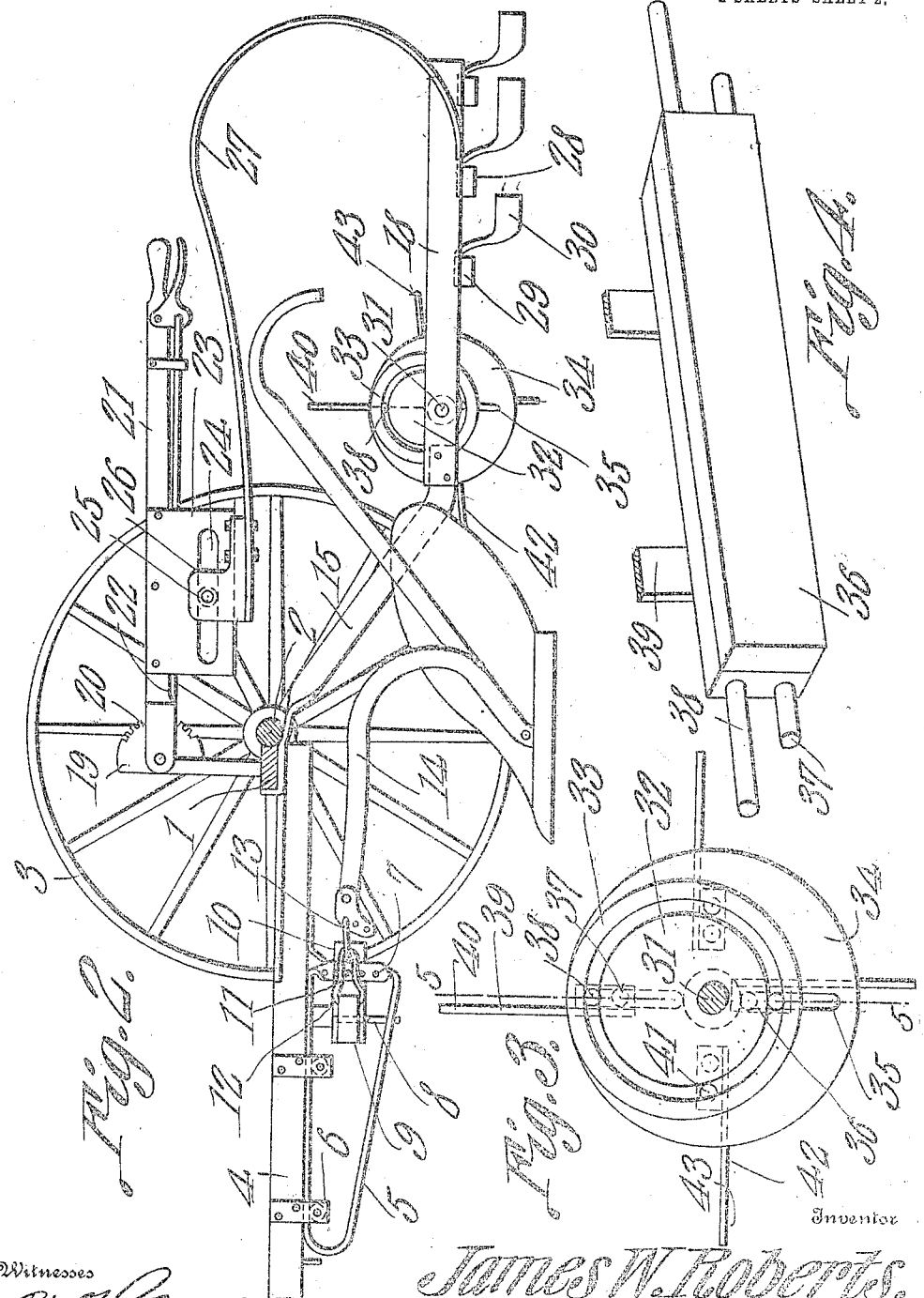

JAMES WILEY ROBERTS, OF POPE, TENNESSEE.

SOIL-PULVERIZING ATTACHMENT FOR PLOWS.

972,025.  Specification of Letters Patent.  Patented Oct. 4, 1910.

Application filed February 24, 1910. Serial No. 545,573.

*To all whom it may concern:*

Be it known that I, JAMES W. ROBERTS, a citizen of the United States, residing at Pope, in the county of Perry and State of Tennessee, have invented a new and useful Soil-Pulverizing Attachment for Plows, of which the following is a specification.

This invention relates to a soil pulverizing attachment for plows, and it consists in the novel construction and arrangement of its parts as hereinafter shown and described.

The object of the invention is to provide a soil pulverizing attachment as indicated which includes a wheel mounted frame to which may be attached a plow. A secondary frame is adjustably attached to the first said frame and is held in desired relation to the same under spring tension which may be increased or diminished as desired. A rotor is mounted in the said secondary frame and is provided with chopping blades of peculiar configuration and arrangement and so mounted that each alternate blade moves radially as the rotor turns upon its axis, the object being that by providing the said radial movement on the part of the alternate blades the said blades will keep themselves free from the accumulation of soil or trash. The arms or spokes of the adjacent blades of the rotor are in staggered relation along the axis of the rotor which relation is also for the purpose of reducing the possibility of the accumulation of trash or stalks between the blades of the rotor. Soil pulverizing devices are carried at the rear end portion of the secondary frame and operate upon the surface of the soil in the manner hereinafter explained.

In the accompanying drawings, Figure 1 is a top plan view of the soil-pulverizing device connected with a plow. Fig. 2 is a vertical longitudinal sectional view of the same. Fig. 3 is an end view of the rotor mounted upon the secondary frame. Fig. 4 is a perspective view of a supporting bar forming a component part of said rotor. Fig. 5 is a vertical sectional view of an end portion of the rotor.

The soil pulverizing attachment includes a frame 1 which is mounted upon an axle 2 which in turn is supported by ground wheels 3, a tongue 4 is connected at its rear portion with the intermediate portion of the frame 1 and is provided upon its under side with a draft frame 5 which is slidably mounted in guides or supports 6 in any appropriate manner. The frame 5 is provided at its rear end with a vertically disposed series of perforations 7 and a pin 8 is supported by the said frame 5. A double tree 9 is slidably mounted upon the pin 8 and is provided with rearwardly disposed lugs 10 which are adapted to receive between them the rear portion of the frame 5 and through perforations in which may be passed a pin 11, said pin also being passed through one of the perforations of the series 7. Thus it will be seen that means is provided for adjusting and supporting the double tree 9 vertically upon pin 8. A link 12 is adjustably secured upon the double tree 9 and connects a clevis 13 which in turn is connected with the forward end of a plow beam 14. By this arrangement it will be seen that means is provided for supporting the forward end of the plow beam 14 in a relatively high or low position and also for adjusting the plow beam to one side or the other of the tongue 4.

A secondary frame is adjustably attached to the primary frame 1 and the said secondary frame includes resilient side strips 15 which are adjustably secured at their upper forward ends by means of bolts 16 which pass through perforations provided in the said strips 15 and perforations 17 provided in the frame 1. The lower rear ends of the side strips 15 are connected with the forward ends of rigid side bars 18 and the said bars 18 are designed to normally occupy horizontal positions or approximately so. A standard 19 is mounted upon the primary frame 1 and is provided with a toothed segment 20. A lever 21 is fulcrumed to the upper portion of the standard 19 and is provided with a spring actuated pawl 22 adapted to engage the teeth of the segment 20. A plate 23 depends from the lever 21 and is provided with an elongated slot 24. A shaft 25 passes transversely through the slot 24 in segment 23 and is provided at its ends with bearings 26 to which are attached the forward ends of curved springs 27. The rear ends of the springs 27 are attached to a cross bar 28 which is one of the component parts of the secondary frame of the soil pulverizer attachment. By swinging the lever 21 it will be seen that the tension of the spring 27 may be increased or diminished and thus the resilient force with which the secondary frame of the attachment is held toward the ground may be adjusted.

Other cross bars 29 (similar to the cross bar 28) form component parts of the secondary frame of the attachment and the cross bars 28 and 29 carry soil pulverizing blades 30 which at their rear portions are preferably disposed at an acute angle to the line of draft of the plow and its attachment.

Spindles 31 are attached to the side bars 18 and project inwardly therefrom. Disks 32 are eccentrically and fixedly mounted upon the spindles 31 adjacent the inner sides of the bars 18 and rings 33 are fixed to the inner sides of the bars 18 and are concentrically arranged with relation to the disk 32. The inner edges of the rings 33 are spaced from the peripheries of the disks 32. Disks 34 are concentrically mounted upon the inner portions of the spindles 31 and are journaled for rotation upon the said spindles. The disks 34 are provided at diametrically opposite sides with elongated slots 35 which are radially disposed. Cross bars 36 are provided at their ends with projecting pins 37 and 38, the pins 38 being longer than the pins 37. The outer end portions of the pins 37 lie in the elongated slots 35 of the disks 34 but do not traverse the planes of the inner sides of the disks 32. The pins 38 project through the elongated slots 35 in the disks 34 and the outer end portions of the pins 38 lie in spaces between the disks 32 and rings 33. Spokes 39 are mounted upon the bars 36 and at their outer ends support chopping blades 40. Bars 41 are fixed to the disks 34 at their ends and said bars are located at diametrically opposite sides of the said disks 34. Spokes 42 are supported by the bars 41 and the said spokes at their outer ends support chopping blades 43. The disks 34 and bars 36 and 41 together with their attachments constitute the rotor above referred to and it will be seen that as the rotor turns upon the axis of the spindles 31 that the projecting pin 38 in contact with the periphery of the disk 32 will cause the spokes 39 and blades 40 to move radially with relation to the axis of the rotor as they move about the same. Thus as the said blades encounter the soil and move away from the same their radial movement with relation to the axis of the rotor will prevent the material from wedging between the spokes 39 and blades 40 and the spokes 42 and blades 43. While the spokes 42 and blades 43 rotate about the axis of the rotor they are confined against radial movement with relation to the said axis. The spokes 42 are in the vicinity of the ends of the bars 41 while the spokes 39 are removed from the ends of the bars 36 and hence the spokes are in staggered relation about the axis of the rotor and such staggered relation further removes the possibility of the said spokes accumulating trash or other objectionable material.

Having described the invention what I claim as new and desire to secure by Letters Patent is:—

1. A soil-pulverizer comprising a frame, a rotor journaled in the frame, blades carried by the rotor, some of said blades being mounted to move radially with relation to the axis of the rotor as they move about the same and other of the blades being fixed with relation to the axis of the rotor.

2. A soil-pulverizer comprising a frame, a rotor journaled in the frame and consisting of disks, blades fixed at their ends to the disks, other blades carried by the disks and adapted to move with relation to the axis of the rotor, the last said blades having projecting pins and disks eccentrically mounted upon the frame with relation to the axis of the rotor and engaged by said pins.

In testimony that I claim the foregoing as my own, I have hereto affixed my signature in the presence of two witnesses.

JAMES WILEY ROBERTS.

Witnesses:
WILLIAM C. POPE,
WILLIAM E. BUSSELL.